United States Patent
Jayasinghe Laddu et al.

(10) Patent No.: US 12,489,516 B2
(45) Date of Patent: Dec. 2, 2025

(54) DOWNSTREAM IAB NODE, METHOD TO OPERATE A DOWNSTREAM IAB NODE, UPSTREAM IAB NODE, METHOD TO OPERATE AN UPSTREAM IAB NODE

(71) Applicant: Nokia Technologies Oy, Espoo (FI)

(72) Inventors: Keeth Saliya Jayasinghe Laddu, Espoo (FI); Ilkka Keskitalo, Oulu (FI); Juha S. Korhonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 509 days.

(21) Appl. No.: 17/929,036

(22) PCT Filed: Feb. 14, 2020

(86) PCT No.: PCT/EP2020/053987
§ 371 (c)(1),
(2) Date: Aug. 10, 2022

(87) PCT Pub. No.: WO2021/160293
PCT Pub. Date: Aug. 19, 2021

(65) Prior Publication Data
US 2023/0079311 A1    Mar. 16, 2023

(51) Int. Cl.
*H04B 7/155*    (2006.01)
*H04W 72/04*    (2023.01)

(52) U.S. Cl.
CPC ........ *H04B 7/15542* (2013.01); *H04W 72/04* (2013.01)

(58) Field of Classification Search
CPC .............................. H04B 7/15542; H04W 72/04
See application file for complete search history.

(56) References Cited

U.S. PATENT DOCUMENTS

2019/0349079 A1    11/2019 Novlan et al.
2020/0053745 A1    2/2020 Luo et al.
(Continued)

FOREIGN PATENT DOCUMENTS

CN    110351836 A    10/2019
CN    110536351 A    12/2019
(Continued)

OTHER PUBLICATIONS

Office action received for corresponding Chinese Patent Application No. 202080099749.X, dated Jul. 27, 2023, 15 pages of office action and no page of translation available.
(Continued)

*Primary Examiner* — Sai Aung
*Assistant Examiner* — Wilfred Thomas
(74) *Attorney, Agent, or Firm* — Lippes Mathias LLP

(57) ABSTRACT

There is provided a method to operate a downstream IAB, Integrated Access and Backhaul, node of an IAB network, is provided, wherein the method comprises: receiving a first radio resource configuration that indicates a use of radio resources by the upstream IAB node and by at least one radio node served by the upstream IAB node; determining a second radio resource configuration or the downstream IAB node in dependence on the first radio resource configuration; and communication with at least one radio node, which is served by the downstream IAB node, via radio resources according to the second radio resource configuration.

18 Claims, 3 Drawing Sheets

(56) References Cited

U.S. PATENT DOCUMENTS

| | | | | |
|---|---|---|---|---|
| 2020/0146025 | A1* | 5/2020 | Choi | H04W 88/14 |
| 2021/0367660 | A1* | 11/2021 | Jo | H04W 72/53 |
| 2021/0400661 | A1* | 12/2021 | Harada | H04W 72/23 |
| 2022/0060247 | A1* | 2/2022 | Harada | H04B 7/15542 |
| 2022/0095283 | A1* | 3/2022 | Wei | H04L 5/0032 |
| 2022/0116104 | A1* | 4/2022 | Liu | H04L 5/0082 |
| 2022/0201681 | A1* | 6/2022 | Harada | H04W 72/046 |
| 2022/0256533 | A1* | 8/2022 | Huang | H04W 72/0453 |
| 2022/0361072 | A1* | 11/2022 | Zhu | H04W 36/0061 |

FOREIGN PATENT DOCUMENTS

| | | |
|---|---|---|
| EP | 3648529 A1 | 5/2020 |
| JP | 2020532901 A | 11/2020 |
| WO | 2019/246470 A1 | 12/2019 |
| WO | 2020/033732 A1 | 2/2020 |

OTHER PUBLICATIONS

"Resource multiplexing between backhaul and access in IAB", 3GPP TSG RAN WG1 Meeting #98bis, R1-1910051, Agenda: 7.2.3.2, Huawei, Oct. 14-20, 2019, 8 pages.

"Resource multiplexing between backhaul and access in IAB", 3GPP TSG RAN WG1 Meeting #96bis, R1-1903938, Agenda: 7.2.3.3, Huawei, Apr. 8-12, 2019, 12 pages.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"New WID: Integrated Access and Backhaul for NR", 3GPP TSG RAN Meeting #82, RP-182882, Agenda: 9.1.2, Qualcomm, Dec. 10-13, 2018, 7 pages.

"New WID on Enhancements to Integrated Access and Backhaul", 3GPP TSG RAN Meeting #86, RP-193251, Agenda: 9.1.2, Qualcomm, Dec. 9-12, 2019, 5 pages.

International Search Report and Written Opinion received for corresponding Patent Cooperation Treaty Application No. PCT/EP2020/053987, dated Oct. 29, 2020, 15 pages.

"Physical layer design for NR IAB", 3GPP TSG RAN WG1 Meeting #94bis, R1-1810130, Agenda: 7.2.3.1, Huawei, Oct. 8-12, 2018, 18 pages.

"NR Physical Layer design for IAB backhaul link", 3GPP TSG RAN WG1 Meeting #94, R1-1808398, Agenda: 7.2.3.1, CATT, Aug. 20-24, 2018, 8 pages.

"Resource allocation and scheduling of IAB networks", 3GPP TSG-RAN WG1 Meeting #94bis, R1-1811513, Agenda: 7.2.3.3, Ericsson, Oct. 8-12, 2018, 11 pages.

Extended European Search Report received for corresponding European Patent Application No. 21156722.7, dated Aug. 19, 2021, 11 pages.

Notice of Allowance received for corresponding European Patent Application No. 21156722.7, dated Sep. 14, 2023, 8 pages.

Office action received for corresponding Japanese Patent Application No. 2022-549134, dated Nov. 30, 2023, 4 pages of office action and 4 pages of translation available.

Notice of Allowance received for corresponding Chinese Patent Application No. 202080099749.X, dated Feb. 4, 2024, 4 pages of Notice of Allowance and no page of translation available.

Notice of Allowance received for corresponding Japanese Patent Application No. 2022-549134, dated Feb. 5, 2024, 2 pages of Notice of Allowance and no page of translation available.

"Mechanisms for resource multiplexing among backhaul and access links", 3GPP TSG RAN WG1 Meeting #98bis, R1-1911194, Agenda: 7.2.3.2, Nokia, Oct. 14-20, 2019, 14 pages.

Office action received for corresponding Indian Patent Application No. 202247052286, dated Dec. 6, 2022, 7 pages.

Office action received for corresponding Vietnamese Patent Application No. 1-2022-05873, dated Aug. 30, 2024, 2 pages of office action and 1 page of translation available.

* cited by examiner

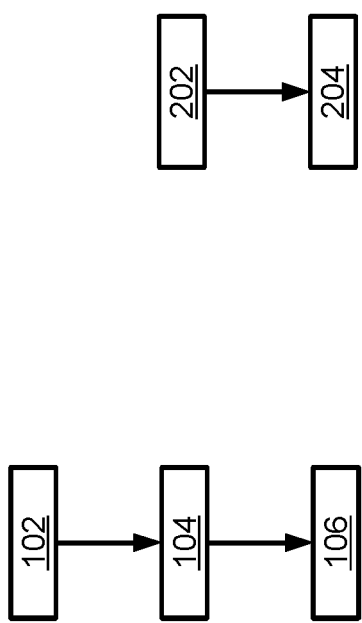
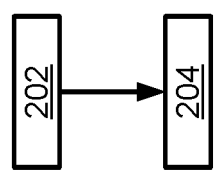
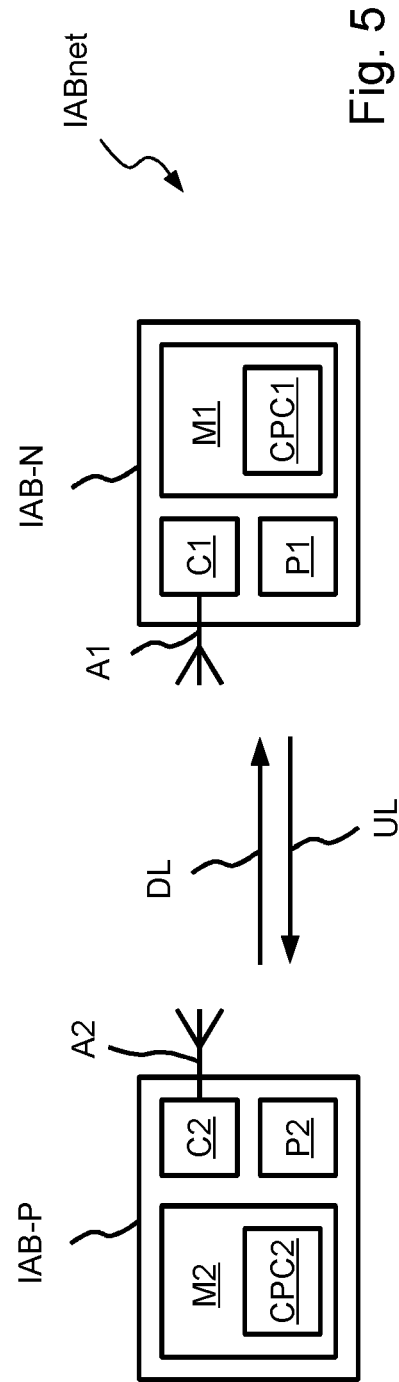

DOWNSTREAM IAB NODE, METHOD TO OPERATE A DOWNSTREAM IAB NODE, UPSTREAM IAB NODE, METHOD TO OPERATE AN UPSTREAM IAB NODE

RELATED APPLICATION

This application was originally filed as PCT Application No. PCT/EP2020/053987, filed on Feb. 14, 2020, which is incorporated herein by reference in its entirety.

FIELD OF THE INVENTION

Various example embodiments relate to enhancements for Integrated Access and Backhaul networks.

BACKGROUND

Integrated Access and Backhaul, IAB, provides means to overcome costly networks by providing wireless backhaul links to relay the access traffic.

SUMMARY

According to a first aspect of the description a downstream IAB, Integrated Access and Backhaul, node is provided, the downstream IAB node comprising at least one processor, at least one memory including computer program code, and at least one communication module, the at least one memory and computer program code configured, with the at least one processor, and the at least one communication module, to cause the downstream IAB node at least to: receive a first radio resource configuration that indicates a radio resource configuration of an upstream IAB node; determine a second radio resource configuration for the downstream IAB node in dependence on the first radio resource configuration; and communicate with the at least one radio node, which is served by the downstream IAB node, via radio resources according to the second radio resource configuration.

For example, a central unit, CU, indicates to the downstream IAB node about the radio resource configuration of the upstream IAB node. The scheme provides an advanced cross-link interference, CLI, handling in IAB networks. Advantageously, the downstream IAB node has precise knowledge of at least a part of the first radio resource configuration, which is actually used in the cell of the upstream IAB node. Advantageously, the determination and use of the second radio resource configuration reduces the CLI, Cross Link Interference, caused by its access UE/child nodes to the access UE/child nodes (downstream IAB node) supported by the parent (upstream IAB node) or neighboring nodes. The benefit of the proposed scheme is therefore a reduction of CLI between UEs in the IAB network.

According to an advantageous example, the first radio resource configuration comprises at least a semi-static radio resource configuration of the upstream IAB node.

Advantageously, the downstream IAB node can avoid using the radio resources indicated by the semi-static radio resource configuration of the upstream IAB node.

According to an advantageous example, the first radio resource configuration comprises hard downlink resources and/or Hard uplink radio resources that are available for the upstream IAB node.

Advantageously, a full DU resource configuration information of the upstream node may not be necessary. For example, if the IAB downstream node supports only DU-TX/MT-TX and TDM, Time Division Multiplexing, operation between access and BH links, an indication of upstream node's Hard-UL resources, and Hard-F resources if UL is scheduled on F resources of a F1-AP, is sufficient.

According to another example, if the IAB downstream node supports only DU-RX/MT-RX and TDM operation between access and BH links, an indication of Hard-DL resources, and Hard-F resources if DL is scheduled on F resources, is sufficient.

In other words, the required resource configuration information is optimized depending on the multiplexing capability of the IAB downstream node and the resource use of the upstream IAB node when supporting its child/access nodes.

According to an advantageous example, the downstream IAB node is further configured to: receive, from the upstream IAB node of the downstream IAB node, a third radio resource configuration that indicates a use of radio resources by a neighboring IAB node of the downstream IAB node and by radio nodes served by the neighboring IAB node; and determine the second radio resource configuration for the downstream IAB node in dependence on the first radio resource configuration and in dependence on the third radio resource configuration.

Advantageously, the radio resources used by the neighboring IAB node are considered when selecting/scheduling the resources in dependence on the second radio resource configuration. This measure further improves CLI management.

According to an example, the third radio resource configuration comprises a semi-static radio resource configuration of the neighboring IAB node.

According to an advantageous example, the downstream IAB node is further configured to: determine the first radio resource configuration by determining a resource usage associated with a Mobile-Termination, MT, function of the downstream IAB node.

For example, when the access and backhaul links of the IAB downstream node is SDMed/FDMed, the resource usage associated with the MT part of the IAB downstream node is advantageously used to predict the possible usage of overlapping resources by the parent upstream IAB node and the downstream IAB node. The knowledge of the possibly overlapping resources advantageously allows to select probably non-overlapping resources to be part of the second radio resource configuration.

According to a second aspect of the description, a method to operate a downstream IAB, Integrated Access and Backhaul, node, is provided, the method comprising: receive a first radio resource configuration that indicates a radio resource configuration of an upstream IAB node; determine a second radio resource configuration for the downstream IAB node in dependence on the first radio resource configuration; and communicate with at least one radio node, which is served by the downstream IAB node, via radio resources according to the second radio resource configuration.

According to a third aspect of the description, a upstream IAB, Integrated Access and Backhaul, node of an IAB network is provided, the upstream IAB node comprising at least one processor, at least one memory including computer program code, and at least one communication module, the at least one memory and computer program code configured, with the at least one processor, and the at least one communication module, to cause the upstream IAB node at least to:

determine or receive a first radio resource configuration that indicates a radio resource configuration of the upstream IAB node; and transmit the first radio resource configuration.

According to an advantageous example, the first radio resource configuration comprises at least a semi-static radio resource configuration of the upstream IAB node.

According to an advantageous example, the first radio resource configuration comprises Hard downlink resources and/or Hard uplink radio resources that are available for the upstream IAB node.

According to an advantageous example, the upstream IAB node is further configured to: transmit a third radio resource configuration that indicates a use of radio resources by a neighboring IAB node of the downstream IAB node and by radio nodes served by the neighboring IAB node.

According to a fourth aspect, a method to operate an upstream IAB, Integrated Access and Backhaul, node, is provided, the method comprising at least: determine or receive a first radio resource configuration that indicates a radio resource configuration of the upstream IAB node; and transmit the first radio resource configuration.

According to a fifth aspect, an IAB network is provided, the IAB network comprising a downstream IAB node according to the first aspect and an upstream IAB node according to one of the third aspect.

According to a sixth aspect, a method to operate an IAB network is provided, the method comprising the method according to the second aspect and the method according to the fourth aspect.

BRIEF DESCRIPTION OF THE FIGURES

FIGS. 1 and 2 each depict a schematical flow chart;
FIG. 5 schematically depicts an IAB network.

DESCRIPTION

Figure 3:
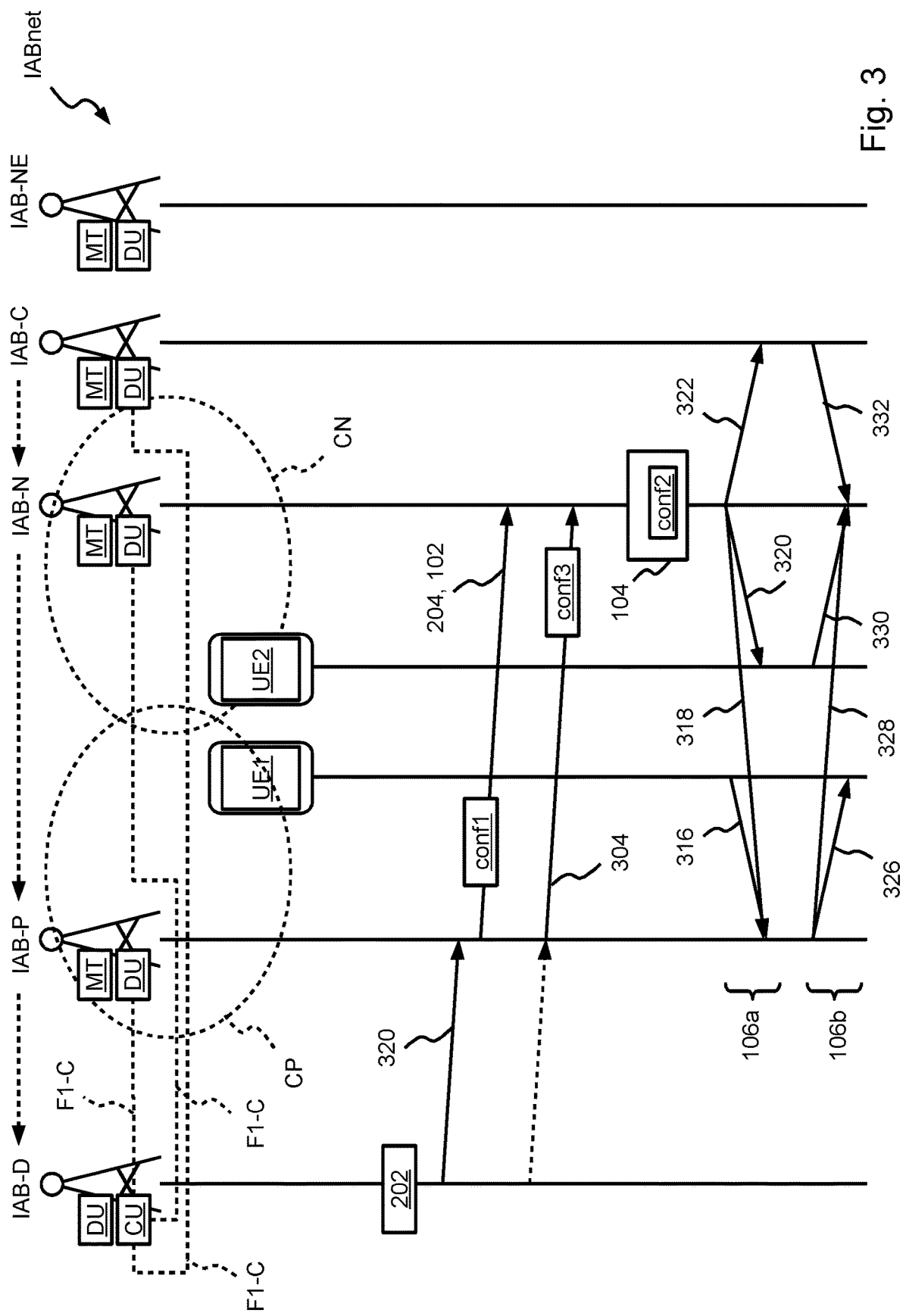
FIG. 3 depicts a schematical sequence diagram.

FIG. 1 depicts a schematical flow chart for operating a downstream IAB, Integrated Access and Backhaul, node of an IAB network. According to a transmission 102, the downstream IAB node receives, from an upstream IAB node, a first radio resource configuration that indicates a use of radio resources by the upstream IAB node and by at least one radio node served by the upstream IAB node. The downstream IAB node determines, according to a processing module or determining means 104, a second radio resource configuration for the downstream IAB node in dependence on the first radio resource configuration. The downstream IAB node communicates, according to a at least one transmission 106 of data and/or at least one reception 106 of data with at least one radio node, which is served by the downstream IAB node, via radio resources according to the second radio resource configuration.

FIG. 2 depicts a schematical flow chart for operating an IAB donor node and the upstream IAB node of the IAB network. The IAB donor node determines, according to a processing module or determining means 202, a first radio resource configuration that indicates the radio resource configuration of the upstream IAB node, in particular also of at least one radio node, which is served by the upstream IAB node. The IAB donor node transmits the first radio resource configuration according to a transmission of to the upstream IAB node. The upstream IAB node transmits, according to a transmission 204, towards the downstream IAB node, the first radio resource configuration. The former transmission covers the case, where the upstream IAB node forwards the radio resource configuration coming from the central unit of the IAB donor node over F1-AP which would be transparent for the upstream IAB node.

FIG. 3 depicts a schematical sequence diagram for operating the IAB network IABnet. The IAB network IABnet comprises the downstream IAB node IAB-N, an upstream IAB node IAB-P, which is a parent node of the downstream IAB node IAB-N, and an IAB donor node IAB-D. In this exemplary IAB architecture, each IAB node holds a DU, Distributed Unit, function and an MT, Mobile-Termination, function. Via the MT, the downstream IAB node IAB-N connects to an upstream IAB-node IAB-P, wherein the upstream IAB-node IAB-P or the IAB donor node IAB-D can be termed IAB parent node of the downstream IAB node IAB-N. The IAB donor node IAB-D comprises a CU, central unit, function, which serves the DU functions of each associated IAB node. Via the DU, the IAB node IAB-P, IAB-N establishes Radio Link Control channels, short RLC-channels, of a corresponding downstream IAB-node IAB-N, IAB-C. An IAB-node can connect to more than one upstream IAB-node or IAB-donor DU. The IAB-node may contain multiple DUs, the respective DU part of the IAB-node has F1-C connection with an associated IAB-donor CU-CP. Therefore, the the first radio resource configuration conf1 is determined by the IAB donor node IAB-D, transmitted via the backhaul link to the upstream IAB node IAB-P and transmitted via the backhaul link to the downstream IAB node IAB-N.

The upstream IAB node IAB-P serves a user equipment UE1, which resides in a cell CP provided by IAB-P. The downstream IAB node IAB-N serves a user equipment UE2, which resides in a cell CN provided by IAB-N. However, UE1 does not reside in the cell CN and UE2 does not reside in the cell CP. CLI between UE1 and UE2 is reduced when taking the measures described herein, as IAB-N knows and/or predicts the radio usage in cell CP and adapts its radio resources usage accordingly.

Furthermore, the IAB network IABnet comprises a child node IAB-C of the downstream node IAB-N, wherein the child node IAB-C is configured like the downstream node IAB-N. The cell CN refers to an area where access UEs are served by the downstream IAB node IAB-N. The child (downstream) IAB node IAB-C of the parent (downstream) node IAB-N serves its own cell (not depicted). The range of the backhaul link, however, may exceed the respective cell size serving the access UEs of one of the IAB node IAB-P, IAB-N, IAB-C.

From an IAB-node MT point-of-view, the following time-domain resources can be indicated for the parent link: Downlink time resource; Uplink time resource; Flexible time resource.

From an IAB-node DU point-of-view, the child link has the following types of time resources: Downlink time resource; Uplink time resource; Flexible time resource; Not available time resources, that means resources not to be used for communication on the DU child links.

Each of the downlink, uplink and flexible time-resource types of the DU child link can belong to one of two categories: Hard: The corresponding time resource H is available for the DU child link; Soft: The availability of the corresponding time resource S for the DU child link, for example of the downstream IAB node IAB-N, is explicitly and/or implicitly controlled by the parent node, for example the upstream IAB node IAB-P.

According to an example, the first radio resource configuration conf1 comprises a semi-static radio resource configuration of the upstream IAB node IAB-P. The IAB node IAB-N is configured to be aware of the semi-static DU resource configuration (D/U/F/H/S/NA) of the upstream IAB node IAB-P. As an alternative, the IAB node IAB-N is provided with the full D/U/F+H/S/NA resource configuration of the DU function of the upstream IAB node IAB-P. The information on semi-static resource configuration of parent (and neighboring) nodes can be provided centrally by the IAB-donor via F1-AP signaling.

The first and second radio resource configurations conf1, conf2 comprise at least one of the following: scheduling parameters and/or parameters like MCS, Modulation and Coding Scheme, number of repetition, resource allocations, current radio resource usage, planned radio resource usage like semi-static radio resources, etc.

According to an example, the first radio resource configuration conf1 comprises hard downlink resources and/or Hard uplink radio resources that are available for the upstream IAB node IAB-P. What resource information needs to be included in the first radio resource configuration conf1 may depend on the FDM/SDM configuration supported by the downstream IAB node IAB-N. If the downstream IAB node IAB-N supports only DU-TX/MT-TX and TDM operation between access and BH links, the first radio resource configuration conf1 with indication of Hard-UL (and Hard-F resources if UL is scheduled on F resources of the upstream IAB node IAB-P) resources can be sufficient. According to another example, if the downstream IAB node IAB-N supports only DU-RX/MT-RX and TDM operation between access and BH links, the first radio resource configuration conf1 with indication of Hard-DL (and Hard-F resources if DL is scheduled on F resources) resources of the upstream IAB node IAB-P can be sufficient.

Furthermore, a neighboring IAB node IAB-NE is present. According to an example, the downstream IAB node IAB-N receives, according to a transmission 304, from the upstream IAB node IAB-P of the downstream IAB node IAB-N, a third radio resource configuration conf3 that indicates a use of radio resources by the neighboring IAB node IAB-NE downstream IAB node IAB-N and by radio nodes served by the neighboring IAB node IAB-NE. The configuration conf3 originates from the central unit CU of the IAB donor node IAB-D, but is transmitted by the upstream IAB node IAB-P in form of a relay station, wherein the neighboring IAB node IAB-NE is under the IAB-D, i.e. there is a connection between these nodes.

The downstream IAB node determines, according to the processing module or determining means 104, the second radio resource configuration conf2 for the downstream IAB node IAB-N in dependence on the first radio resource configuration conf1. Therefore, CLI management is provided for UE1 and UE2.

According to an example, the downstream IAB node determines, according to the processing module or determining means 104, the second radio resource configuration conf2 for the downstream IAB node IAB-N in dependence on the first radio resource configuration conf1 and in dependence on the third radio resource configuration conf3. Therefore, CLI management comprises that the CU function of the IAB donor determines the at least one neighbouring IAB-NE of the downstream IAB node IAB-N. The IAB-N is configured to be aware of the semi-static DU resource configuration (D/U/F/H/S/NA) of its neighbouring IAB node IAB-NE. According to an example, the resource usage of the upstream IAB node IAB-P, includes at least one indicator indicating of TDMed, FDMed or SDMed access of UEs/child nodes with the backhaul link is received by the downstream IAB node IAB-N (FDM: Frequency Division Multiplexing).

According to an example, the downstream IAB node IAB-N determines, according to the processing module or determining means 102, the first radio resource configuration conf1 by determining a resource usage associated with the Mobile-Termination, MT, function of the downstream IAB node IAB-N.

According to an example, the downstream IAB node IAB-N uses the received radio resource configuration conf1 to estimate the CLI between UE1 and UE2 by selecting multiple CSI-RS/SRS configurations, for example, UE2 is scheduled with different CSI-RS measurements and reporting configurations based on anticipated interference scenarios of the CLI.

According to an example, SDM, space division multiplexing, is used by the downstream IAB node. Hard resources can be configured at both upstream and downstream IAB node IAB-P and IAB-N to allow SDM operation. When there is lower traffic in the UL direction in the backhaul link compared to the DL towards UE2, due to the first radio resource configuration conf1 received at the downstream IAB node IAB-N, the downstream IAB node IAB-N can continue supporting the UE2, whereas the parent upstream IAB node IAB-P allocates its hard resources in the UL transmission towards UE1. This may create CLI from UE1 to UE2 in some resources. Similarly, many other possible resource configuration scenarios and scheduling options of nodes can create different CLI scenarios.

How the knowledge of the upstream IAB node configuration at the downstream IAB node, namely IAB-N, helps in preventing significant CLI is exemplified in the following. The downstream IAB node IAB-N is aware of the semi-static DU resource configuration like D/U/F/H/S/NA of its parent IAB-P, wherein at least a plurality of Hard-UL resources are known at IAB-N. The parent node may indicate via the radio resource configuration, that the resources are TDMed to different nodes. The IAB node IAB-N uses the received first radio resource configuration, for example H-UL resources and the possibility of using them on UE1, on at least one of: Triggering an aperiodic CSI measurement to estimate the CLI at the UE2; Schedule the UL transmission in a more robust manner by adjusting the second radio resource configuration, like MCS, the number of repetition, etc.; Schedule the UL transmission in different resources according to the second resource configuration to avoid CLI.

The communication, according to a reference sign 106a, comprises: According to transmissions 316, 318, 320 and 322, UE1 and IAB-N transmit data at substantially the same time but in disjoint radio resources according to the second radio resource configuration conf2.

The communication, according to a reference sign 106b, comprises: According to transmissions 326, 328, 330 and 332, IAB-P and IAB-C transmit data at substantially the same time but in disjoint radio resources according to the second radio resource configuration conf2.

Figure 4:
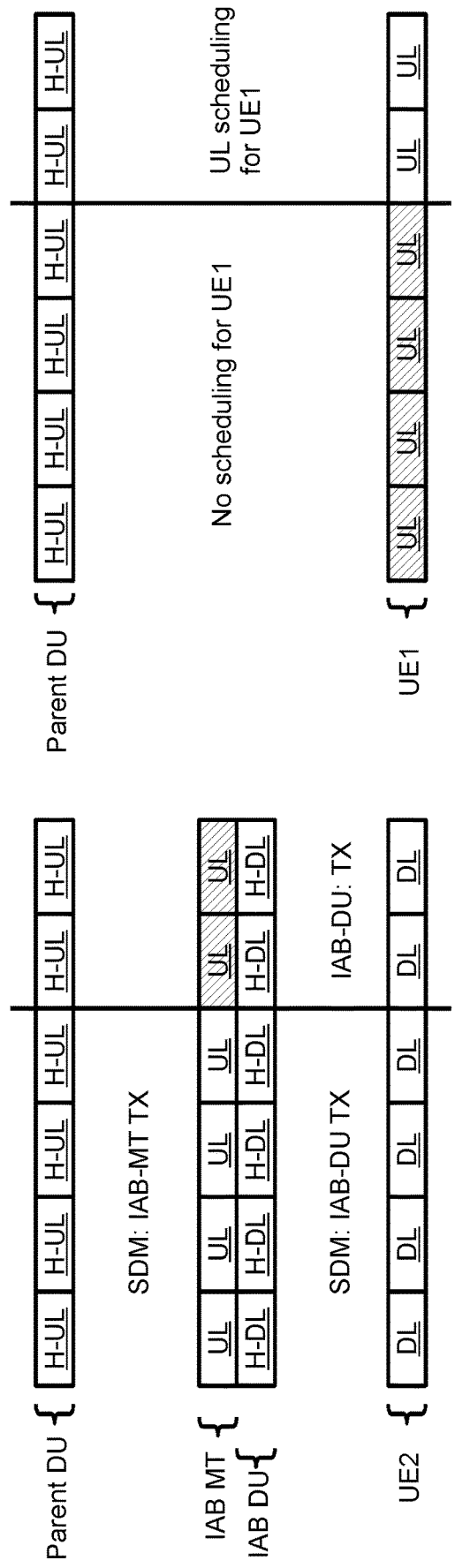
FIG. 4 depicts schematically an example of radio resource configurations.

FIG. 4 depicts schematically an example of Parent/IAB/UE radio resource configurations. Parent-UE1 and UE2-IAB DU links are active on the same resources. The radio resources being not scheduled are shown with hatching.

For example, there is lower traffic in the UL direction in the backhaul link compared to the DL towards UE2. In the FIG. 4 this is shown by the UE2 receiving in every resource while IAB MT is transmitting only in the first four resources. The parent node may allocate its two UL hard resources, not needed for IAB MT UL, for UL transmission of UE1. This may lead to the situation that UE2 is receiving in the resources where UE1 is transmitting, which may allocate its hard resources in the UL transmission towards another UE, for example UE1. This may create CLI from UE1 to UE2 in the last two resources. Similarly, many other possible resource configuration scenarios and scheduling options of nodes can create different CLI scenarios.

When the resource configuration of the parent node is known by the IAB node, the IAB node has multiple ways of avoiding excessive CLI in the example of FIG. 4. According to an example, the IAB node is given the semi-static resource configuration of the parent node. Based on that information, IAB node knows that, because all the resources are UL hard for the parent DU, the parent node may be scheduling UL transmissions for other child nodes and UEs in the last two resources, which may cause CLI for UE2 DL reception in those resources. In this situation the IAB node may (1) trigger CSI measurements for UE2 to estimate CLI, (2) schedule more robust transmission scheme for those resources where CLI may appear or has been observed to appear, and (3) avoid using the resources for UE2 if excessive CLI is observed in CSI measurements.

According to an example, the IAB downstream node
  transmits a CSI triggering information towards at least one of its served UE, for example UE2;
  receives a CSI measurement information or CSI estimation information from the at least one of its served UE, wherein the CSI measurement information or CSI estimation information indicates radio resources being used by another radio entity, for example UE1; and
  refrains from scheduling the indicated radio resources for communication with the at least one served UE, in particular by determining the second radio configuration in dependence on the indicated radio resources and in dependence on the first configuration.

According to another example, the IAB node may receive more detailed information on the parent node's resource use. For instance, it may be indicated that parent node is not scheduling any UL transmissions in the last two resources although those resources are UL hard resources. In this case, the IAB node knows there is no risk of CLI, if it schedules DL transmissions towards UE2. On the other hand, if it is indicated that the last resources are scheduled for UL by the parent node, the risk of CLI is known to be high.

FIG. 5 schematically depicts the IAB network IABnet. The downstream IAB node IAB-N comprises at least one processor P1, at least one memory M1 including computer program code CPC1, and at least one communication module C1 that is coupled with at least one antenna A1. The at least one memory M1 and computer program code CPC1 are configured, with the at least one processor P1, and the at least one communication module or communication means C1, to cause the downstream IAB node IAB-N at least to operate according to the present description. The upstream IAB node IAB-P comprises at least one processor P2, at least one memory M2 including computer program code CPC2, and at least one communication module or communication means C2 that is coupled with at least one antenna A2. The at least one memory M2 and computer program code CPC2 are configured, with the at least one processor P2, and the at least one communication module C2, to cause the upstream IAB node IAB-P at least to operate according to the present description. The downstream IAB node IAB-N transmits signals in an uplink direction UL to the upstream IAB node IAB-P. The upstream IAB node IAB-P transmits signals in a direction DL to the downstream IAB node IAB-N.

Certain abbreviations that may be found in the description and/or in the figures are herewith defined as follows:
  CLI Cross Link Interference
  IAB Integrated Access and Backhaul
  MCS Modulation and Coding Scheme
  BH back haul
  DL downlink
  RX reception
  TX transmission
  UL uplink
  F1-AP F1 Application Protocol
  MT Mobile Termination
  DU Distributed Unit
  CU Central Unit
  CU-CP Central Unit Control Plane
  CSI-RS Channel State Information Reference Signal
  TDM Time division multiplexing
  SDM Space division multiplexing
  FDM Frequency division multiplexing
  UE User Equipment Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A downstream IAB, Integrated Access and Backhaul, node (IAB-N) comprising at least one processor, at least one memory including computer program code, and at least one communication module, the at least one memory and computer program code configured, with the at least one processor, and the at least one communication module, to cause the downstream IAB node (IAB-N) at least to:
  receive or determine a first radio resource configuration (conf1) that indicates a radio resource configuration of an upstream IAB node (IAB-P);
  determine a second radio resource configuration (conf2) for the downstream IAB node (IAB-N) in dependence on the first radio resource configuration (conf1); and
  transmit and/or receive data via radio resources according to the second radio resource configuration (conf2);
  wherein the downstream IAB node (IAB-N) is further configured to:
  receive a third radio resource configuration (conf3) that indicates a use of radio resources by a neighboring IAB node (IAB-NE) of the downstream IAB node (IAB-N) and by radio nodes served by the neighboring IAB node (IAB-NE); and
  determine the second radio resource configuration (conf2) for the downstream IAB node (IAB-N) in dependence on the first radio resource configuration (conf1) and in dependence on the third radio resource configuration (conf3).

2. The downstream IAB node (IAB-N) according to claim 1, wherein the first radio resource configuration (conf1) comprises at least a semi-static radio resource configuration of the upstream IAB node (IAB-P).

3. The downstream IAB node (IAB-N) according to claim 1, wherein the first radio resource configuration (conf1) comprises hard downlink resources and/or hard uplink radio resources that are available for the upstream IAB node (IAB-P).

4. The downstream IAB node (IAB-N) according to claim 1, being further configured to:
 determine the first radio resource configuration (conf1) by determining a radio resource usage associated with a Mobile-Termination, MT, function of the downstream IAB node (IAB-N).

5. The downstream IAB node (IAB-N) according to claim 1, wherein the first radio resource configuration (conf1) indicates the radio resource configuration of the upstream IAB node (IAB-P) and a radio resource configuration of at least one radio node (UE1; IAB-N) served by the upstream IAB node (IAB-P).

6. A method to operate a downstream IAB, Integrated Access and Backhaul, node (IAB-N), the method comprising:
 receiving or determining a first radio resource configuration (conf1) that indicates a radio resource configuration of an upstream IAB node (IAB-P);
 determining a second radio resource configuration (conf2) for the downstream IAB node (IAB-N) in dependence on the first radio resource configuration (conf1); and
 transmit and/or receive data via radio resources according to the second radio resource configuration (conf2);
 wherein the method further comprises
 receiving a third radio resource configuration (conf3) that indicates a use of radio resources by a neighboring IAB node (IAB-NE) of the downstream IAB node (IAB-N) and by radio nodes served by the neighboring IAB node (IAB-NE); and
 determining the second radio resource configuration (conf2) for the downstream IAB node (IAB-N) in dependence on the first radio resource configuration (conf1) and in dependence on the third radio resource configuration (conf3).

7. The method according to claim 6, wherein the first radio resource configuration (conf1) comprises at least a semi-static radio resource configuration of the upstream IAB node (IAB-P).

8. The method according to claim 6, wherein the first radio resource configuration (conf1) comprises hard downlink resources and/or hard uplink radio resources that are available for the upstream IAB node (IAB-P).

9. The method according to claim 6, the method comprising
 determine the first radio resource configuration (conf1) by determining a radio resource usage associated with a Mobile-Termination, MT, function of the downstream IAB node (IAB-N).

10. The method according to claim 6, wherein the first radio resource configuration (conf1) indicates the radio resource configuration of the upstream IAB node (IAB-P) and a radio resource configuration of at least one radio node (UE1; IAB-N) served by the upstream IAB node (IAB-P).

11. An upstream IAB, Integrated Access and Backhaul, node (IAB-P, IAB-D) comprising at least one processor, at least one memory including computer program code, and at least one communication module, the at least one memory and computer program code configured, with the at least one processor, and the at least one communication module, to cause the upstream IAB node (IAB-P, IAB-D) at least to:
 determine or receive a first radio resource configuration (conf1) that indicates a radio resource configuration of the upstream IAB node (IAB-P, IAB-D); and
 transmit the first radio resource configuration (conf1) towards a downstream IAB node (IAB-N);
 wherein the upstream IAB node (IAB-P, IAB-D) is further configured to:
 transmit a third radio resource configuration (conf3) that indicates a use of radio resources by a neighboring IAB node (IAB-NE) of a downstream IAB node (IAB-N) and by radio nodes served by the neighboring IAB node (IAB-NE).

12. The upstream IAB node (IAB-P, IAB-D) according to claim 11, wherein the first radio resource configuration (conf1) comprises at least a semi-static radio resource configuration of the upstream IAB node (IAB-P, IAB-D).

13. The upstream IAB node (IAB-P, IAB-D) according to claim 11, wherein the first radio resource configuration (conf1) comprises Hard downlink resources and/or Hard uplink radio resources that are available for the upstream IAB node (IAB-P, IAB-D).

14. The upstream IAB node (IAB-P, IAB-D) according to claim 11, wherein the first radio resource configuration (conf1) indicates the radio resource configuration of the upstream IAB node (IAB-P) and a radio resource configuration of at least one radio node (UE1; IAB-N) served by the upstream IAB node (IAB-P).

15. A method to operate an upstream IAB, Integrated Access and Backhaul, node (IAB-P, IAB-D), the method comprising at least:
 determining or receive a first radio resource configuration (conf1) that indicates a radio resource configuration of the upstream IAB node (IAB-P); and
 transmitting the first radio resource configuration (conf1) towards a downstream IAB node (IAB-N);
 wherein the method further comprises
 transmitting a third radio resource configuration (conf3) that indicates a use of radio resources by a neighboring IAB node (IAB-NE) of a downstream IAB node (IAB-N) and by radio nodes served by the neighboring IAB node (IAB-NE).

16. The method according to claim 15, wherein the first radio resource configuration (conf1) comprises at least a semi-static radio resource configuration of the upstream IAB node (IAB-P, IAB-D).

17. The method according to claim 15, wherein the first radio resource configuration (conf1) comprises Hard downlink resources and/or Hard uplink radio resources that are available for the upstream IAB node (IAB-P, IAB-D).

18. The method according to claim 15, wherein the first radio resource configuration (conf1) indicates the radio resource configuration of the upstream IAB node (IAB-P) and a radio resource configuration of at least one radio node (UE1; IAB-N) served by the upstream IAB node (IAB-P).

* * * * *